(12) United States Patent
Cho

(10) Patent No.: US 8,881,860 B2
(45) Date of Patent: Nov. 11, 2014

(54) MOTOR CONTROL APPARATUS AND METHOD OF CONTROLLING DRIVING OF MOTOR BY MOTOR CONTROL APPARATUS

(71) Applicant: LSIS Co., Ltd., Anyang-si (KR)

(72) Inventor: Duk Yun Cho, Suwon-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/887,127

(22) Filed: May 3, 2013

(65) Prior Publication Data

US 2013/0299267 A1 Nov. 14, 2013

(30) Foreign Application Priority Data

May 14, 2012 (KR) ........................ 10-2012-0050968

(51) Int. Cl.
*B60K 28/10* (2006.01)

(52) U.S. Cl.
USPC ........................................................ 180/279

(58) Field of Classification Search
USPC ............. 280/279, 271, 274; 701/70; 180/279, 180/271, 274
See application file for complete search history.

(56) References Cited

U.S. PATENT DOCUMENTS

| | | | | |
|---|---|---|---|---|
| 6,859,731 | B2* | 2/2005 | Takafuji et al. | 701/301 |
| 8,157,045 | B2* | 4/2012 | Hashimoto et al. | 180/268 |
| 2002/0195290 | A1* | 12/2002 | Hayakawa | 180/277 |
| 2012/0078466 | A1* | 3/2012 | Natori et al. | 701/36 |

FOREIGN PATENT DOCUMENTS

| | | |
|---|---|---|
| JP | 05-286407 | 11/1993 |
| JP | 06-209581 | 7/1994 |
| JP | 06-233450 | 8/1994 |
| JP | 07-227095 | 8/1995 |
| JP | 08-065801 | 3/1996 |
| JP | 2000-156917 | 6/2000 |

OTHER PUBLICATIONS

Japan Patent Office Application Serial No. 2013-100845, Office Action dated Jun. 26, 2014, 5 pages.

* cited by examiner

*Primary Examiner* — Faye M. Fleming
(74) *Attorney, Agent, or Firm* — Lee, Hong, Degerman, Kang & Waimey

(57) ABSTRACT

Disclosed are a motor control apparatus and a method of controlling driving of a motor by the motor control apparatus, in which the motor control apparatus, which controls an electrically-driven motor, autonomously detects vehicle collision to autonomously control the operating state of the motor. The method includes determining a collision state of a vehicle, and stopping the driving of the motor according to the collision state of the vehicle.

14 Claims, 8 Drawing Sheets

MOTOR CONTROL APPARATUS AND METHOD OF CONTROLLING DRIVING OF MOTOR BY MOTOR CONTROL APPARATUS

CROSS-REFERENCE TO RELATED APPLICATIONS

Pursuant to 35 U.S.C. §119(a), this application claims the benefit of earlier filing date and right of priority to Korean Patent Application No. 10-2012-0050968, filed on May 14, 2012, the contents of which are incorporated by reference herein in their entirety.

BACKGROUND

The embodiment relates to a motor control apparatus. In particular, the embodiment relates to a motor control apparatus and a method of controlling driving of a motor by the motor control apparatus, in which the motor control apparatus, which controls an electrically-driven motor, can autonomously detect vehicle collision to autonomously control the operating state of the motor.

An electric vehicle refers to a vehicle using a battery and an electric motor without using oil fuel and an engine.

Recently, the restriction on exhaust fumes of the vehicle has been strengthened due to the environmental pollution (pollution) in the USA and Europe, and an oil price is sharply raised, so that the electric vehicle has been spotlighted as a next-generation vehicle. In other words, an electric vehicle employing electric energy, which does not cause pollution, can fundamentally solve environmental problems such as noxious exhaust fumes or noise discharged from an internal combustion engine vehicle causing around 70% of the environmental pollutions. In addition, the electric vehicle can prolong the life span of resources including fossil fuel, such as oil, to several times.

FIG. 1 is a view showing a motor control apparatus of a typical electric vehicle.

Referring to FIG. 1, the motor control apparatus of the electric vehicle includes a battery 10, an inverter 20, and a 3-phase motor 30, and a motor control unit 40.

The inverter 20 performs a switching operation with respect to DC power supplied to the battery 10 so that AC power can be applied to the 3-phase motor 30. The motor control unit 40 controls the switching operation of the inverter 20.

In addition, the inverter 20 turns on or turns off six switching devices in order to convert DC power into AC power. For example, if the torque required by a driver is generated, the motor control unit 40 calculates a current instruction value actually applied to the 3-phase motor 30, and determines on/off operations of the six switching devices of the inverter according to the current instruction value.

Meanwhile, in general, when controlling most AC motors, such as induction motors or synchronous motors, supplied with 3-phase power, independent torque control is performed by dividing a 3-phase stator current into a flux component and a torque component.

For example, since a large-capacity 3-phase motor used in a hybrid vehicle or an electric vehicle requires exact torque control, the motor is controlled by identically applying the above scheme to the motor. In this case, two current components of the flux component and the torque component pass through a current controller and then allow power in the form of a voltage to be applied to the 3-phase motor through the inverter.

As described above, the motor control apparatus mainly includes the inverter 20 and the motor control unit 40 to control the switching operation of switching devices constituting the inverter 20. The motor control unit 40 controls the operation of the inverter 20 according to the operating states of the inverter 20 or the 3-phase motor 30, so that power is selectively applied to the 3-phase motor 30.

In addition, the typical motor control apparatus monitors error signals through an external electronic control unit (ECU) to cut off power supplied to the 3-phase motor 30, thereby ensuring safety.

The information on the collision state of the vehicle is transferred to the motor control unit 40 through an airbag control unit for passenger protection or a vehicle control unit for the overall control of the vehicle, and the motor control unit 40 selectively cuts off the power based on the information.

However, if the collision information of the vehicle is not transferred to the motor control unit 40 due to serous collision or the erroneous operation of the ECU providing the information, the motor control unit 40 continuously outputs a PWM signal used to drive the 3-phase motor 30. Accordingly, the vehicle is moved due to the continuous driving of the 3-phase motor 30, so that the risk of the driver may be increased.

SUMMARY

The embodiment provides a motor control apparatus and a method of controlling driving of a motor by the motor control apparatus, in which the motor control apparatus includes a sensor to detect the collision state of a vehicle, so that the collision state of the vehicle can be actively detected inside the motor control apparatus.

The embodiment provides a motor control apparatus and a method of controlling driving of a motor by the motor control apparatus, in which the motor control apparatus can autonomously ensure the safety of a driver according to the dangerous state of the vehicle by restricting the driving of a motor based on the operating state of various components constituting the motor control apparatus and the collision state of the vehicle.

According to the embodiment, there is provided a method of controlling driving of a motor by a motor control apparatus. The method includes determining a collision state of a vehicle, and stopping the driving of the motor according to the collision state of the vehicle.

According to the embodiment, there is provided a motor control apparatus for controlling driving of a motor. The motor control apparatus includes a collision signal input unit to detect an impact degree in a vehicle and receive a collision signal corresponding to the detected impact degree, a motor control unit to determine a collision state of the vehicle according to the collision signal received through the collision signal input unit, and selectively generate a PWM signal to drive the motor according to the determined collision state, and a PWM output unit including at least one switching device to supply driving power to the motor through the PWM signal selectively generated from the motor control unit. The motor control unit stops generating the PWM signal to cut off the driving power supplied to the motor when a vehicle collision is determined.

DETAILED DESCRIPTION OF THE EMBODIMENTS

Figure 1:
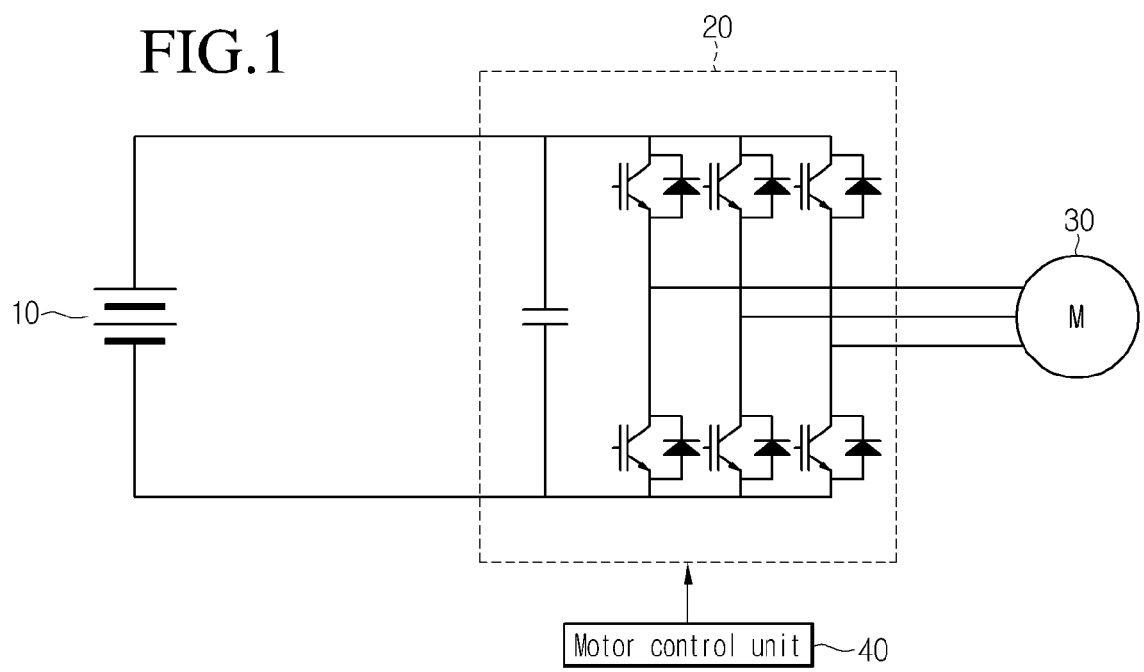
FIG. 1 is a view showing a motor control apparatus of a typical electric vehicle.

Terms and words used in the specification and the claims shall not be interpreted as commonly-used dictionary meanings, but shall be interpreted as to be relevant to the technical scope of the invention based on the fact that the inventor may properly define the concept of the terms to explain the invention in best ways.

Therefore, the embodiments and the configurations depicted in the drawings are illustrative purposes only and do not represent all technical scopes of the embodiments, so it should be understood that various equivalents and modifications may exist at the time of filing this application.

The present embodiment provides a motor control apparatus, capable of autonomously determining the dangerous situation of a vehicle without relying on external devices, thereby actively stopping the vehicle upon the collision accident of the vehicle, so that the safety of occupants and the safety of a counterpart vehicle can be ensured, and a method of controlling driving of a motor by the motor control apparatus.

Figure 2:
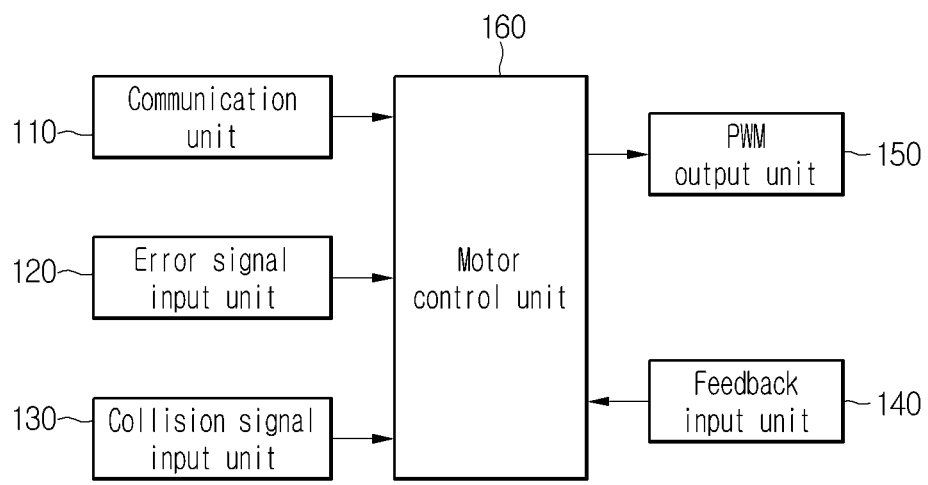
FIG. 2 is a block diagram showing a motor control apparatus according to the embodiment.

FIG. 2 is a block diagram showing a motor control apparatus 100 according to the embodiment.

The motor control apparatus 100 shown in FIG. 2 may refer to an inverter, and controls the driving of the motor to supply power to a vehicle.

The motor control apparatus 100 includes a communication unit 110, an error signal input unit 120, a collision signal input unit 130, a feedback input unit 140, a PWM output unit 150, and a motor control unit 160.

The communication unit 110 receives an accelerator command or a brake command of a driver, and transmits the received accelerator command or the received brake command to the motor control unit 160.

In addition, the communication unit 110 is connected to at least one electronic control unit (ECU) to transmit a signal received therein from the connected ECU.

Signals transmitted through the ECU include a vehicle engine speed detection signal, an engine knocking detection signal, a vehicle speed detection signal, a measurement signal of air-intake of an engine, a measurement signal of cooling water temperature to diagnose an over-heated engine, a temperature measurement signal of intake air for the optimal fuel injection, a measurement signal of an opening angle of a throttle, a pressure measurement signal of intake air, an exhaust gas measurement signal, signals related to operating states of an injector for fuel injection, a fuel pump, and a relay, and measurement signals of various vehicle components such as an idle speed controller to control the idling of an engine.

The error signal input unit 120 receives error signals according to operating states of the motor control apparatus 100.

The error signal input through the error signal input unit 120 includes an error signal of a current flowing through the motor control apparatus 100, an error signal resulting from a short state of a switching device, or an error signal resulting from the deviation from the position of the motor.

The collision signal input unit 130 detects the collision state of the vehicle, and receives the collision signal corresponding to the detected collision state if the collision state of the vehicle is detected.

In other words, the collision signal input unit 130 receives the accelerating direction and the impulse exerted on a vehicle through sensors to detect the accelerating direction and the impulse exerted on the vehicle. If the received impulse is beyond a predetermined reference value, the motor control apparatus 100 detects the collision of the vehicle to recognize the impact direction of the vehicle by using the acceleration direction of the vehicle.

The feedback input unit 140 detects power supplied to a motor and transmits information (e.g., 3-phase current signal) corresponding to the detected power to the motor control unit 160.

In other words, the feedback input unit 140 detects the quantity of power, which is actually supplied to the motor, to transmit the detected information to the motor control unit 160. Accordingly, the detected information may be used in order to match the actual driving state of the motor with the target driving state of the motor.

The PWM output unit 150 performs a switching operation in response to a PWM signal applied through the motor control unit 160 to supply power to the motor. To this end, the PWM output unit 150 includes a plurality of switching devices.

In other words, the PWM output unit 150 includes a plurality of switching devices. The switching devices may include semiconductor switches turned on or turned off under the control of gates thereof by the motor control unit 160. For example, the PWM output unit 150 may include a silicon coupled rectifier (SCR) or an insulated gate bipolar transistor (IGBT). In addition, each of the switching devices includes body diodes connected to each other in parallel. The body diode is a reverse current protection diode to prevent current from reversely flowing from an output terminal of the PWM output unit 150 to a related switching device.

The switching operation of the switching devices constituting the PWM output unit 150 may be controlled by the motor control unit 160, which matches the target output power supplied to the motor with the feedback power, which is currently fed back. In other words, the switching operation of the PWM output unit 150 may be controlled according to the PWM signal output from the motor control unit 160.

The motor control unit 160 controls the overall operation of the motor control apparatus 100.

In particular, the motor control unit 160 calculates the speed of the motor according to the feedback signal input through the feedback input unit 140 and the signal input through the communication unit 110, and outputs a PWM signal corresponding to the calculated speed.

In addition, the motor control unit 160 receives an error signal input through the error signal input unit 120. If determination that the errors serving as factors dangerous for the vehicle exist is made based on the received error signal, the motor control unit 160 blocks the PWM signal to cut off power supplied to the motor.

In addition, the motor control unit 160 receives a collision signal input through the collision signal input unit 130 and determines the collision state of the vehicle according to the received collision signal. If the motor control unit 160 determines the collision of the vehicle, the motor control unit 160 blocks the PWM signal to cut off power supplied to the motor.

Hereinafter, the motor control unit 160 will be described in more detail.

Figure 3:
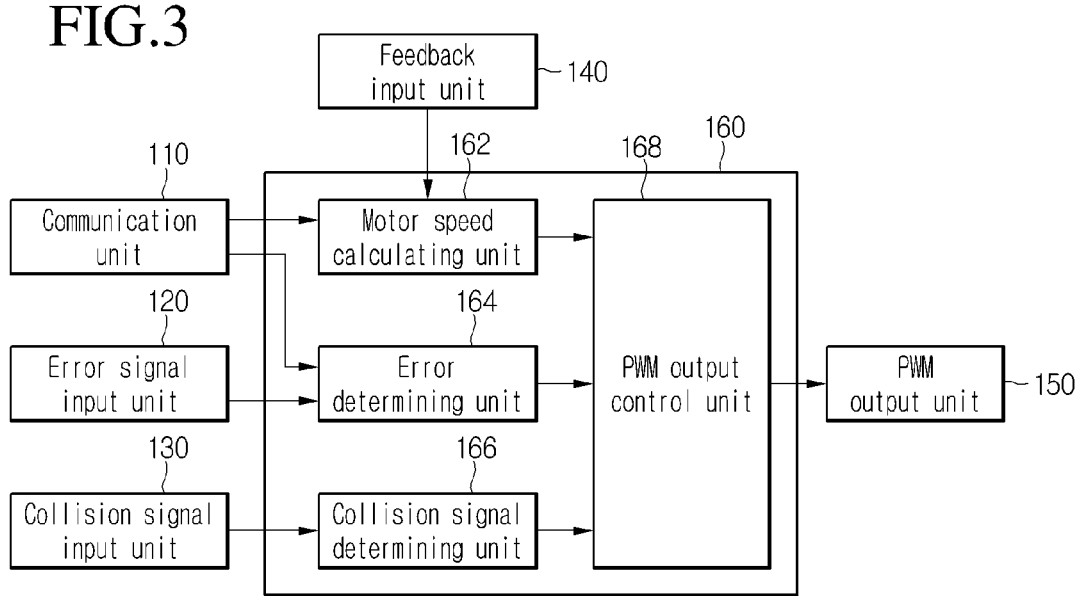
FIG. 3 is a detailed block diagram showing a motor control unit of FIG. 2.

FIG. 3 is a detailed block diagram showing the motor control unit 160 shown in FIG. 2.

Referring to FIG. 3, the motor control unit 160 includes a motor speed calculating unit 162, an error determining unit 164, a collision signal determining unit 166, and a PWM output control unit 168.

The motor speed calculating unit 162 calculates the speed of the motor based on the command of a driver received through the communication unit 110 and the feedback signal received through the feedback input unit 140.

The motor speed calculating unit 162 may include a current controller. The current controller may use a double-band hysteresis current controller (for example, 5-level hysteresis current controller). In other words, a large-capacity 3-phase motor used in an electric vehicle requires more exact torque control. To this end, a 3-phase stator current is divided into a magnetic flux component (id) and a torque component (iq).

In addition, the two-current components divided into the magnetic flux component and the torque component pass through the 5-level hysteresis controller, and the current controller determines a current instruction value proportional to required torque. For example, if a 2-phase current instruction value is determined, a voltage vector is selected by applying the combination of instruction values, which are made through a preset selection table, to the voltage vector.

Meanwhile, the voltage vector refers to a vector to determine the size of a voltage to be applied by the motor control apparatus 100 (more exactly, PWM output unit 150). Accordingly, the on-off pattern of the switching devices constituting the PWM output unit 150 is determined. If the voltage vector is determined, the PWM output unit 150 applies power in the form of voltage to the 3-phase motor.

For example, the PWM output unit 150 includes six switching devices to convert DC voltage into AC voltage through various switching combinations. For example, the PWM output unit 150 may include a 180° conduction type inverter using six effective voltage vectors and one zero-voltage vector.

If the motor speed is calculated through the motor speed calculating unit 162 (voltage vector is determined), the PWM output control unit 168 generates a PWM signal corresponding to the calculated motor speed and applies the PWM signal to the PWM output unit 150.

The error determining unit 164 detects the dangerous situation occurring in a vehicle by using an operating signal and an error signal input through the communication unit 110 and the error signal input unit 120, respectively. Accordingly, if the dangerous situation is detected, the error determining unit 164 supplies information corresponding to the detected dangerous situation to the PWM output control unit 168.

For example, the error determining unit 164 receives a signal, which is transmitted from at least one ECU, through the communication unit 110 to detect if at least one error signal is received through the ECU. If the error signal is received, the error determining unit 164 blocks the output of the PWM signal until the problem resulting from the error signal is solved, so that power is not supplied to the motor.

In addition, the error determining unit 164 receives an error signal received through the error signal input unit 120. If the error determining unit 164 detects an abnormal situation through the error signal, the error determining unit 164 blocks the output of the PWM signal until the abnormal situation is eliminated. In this case, the error signal is a signal measured according to the internal state of the motor control unit 160.

In other words, the signal received through the communication unit 110 is an error signal resulting from the abnormal situation occurring at the outside of the motor control unit 160. The signal received through the error signal input unit 120 is an error signal resulting from the abnormal situation occurring at the inside of the motor control unit 160.

The collision signal determining unit 166 receives a collision signal received through the collision signal input unit 130 and determines the collision state of the vehicle according to the received collision signal.

In other words, the received collision signal includes a previously-measured acceleration direction of a vehicle and the impulse measurement signal of the vehicle. If the impulse measurement signal is beyond the preset reference value, the collision signal determining unit 166 detects the current collision of the vehicle to transmit a signal of informing the PWM output control unit 168 of the collision.

If the signal of informing the collision is received through the collision signal determining unit 166, the PWM output control unit 168 blocks the output of the PWM signal to restrict power supplied to the motor.

As described above, the motor control unit 160 receives signals of autonomously informing a dangerous situation occurring in a vehicle through the communication unit 110, the error signal input unit 120, and the collision signal input unit 130. Therefore, as the dangerous situation is detected, the motor control unit 160 blocks the output of the PWM signal to prevent the motor from being driven under the dangerous situation.

Figure 4:
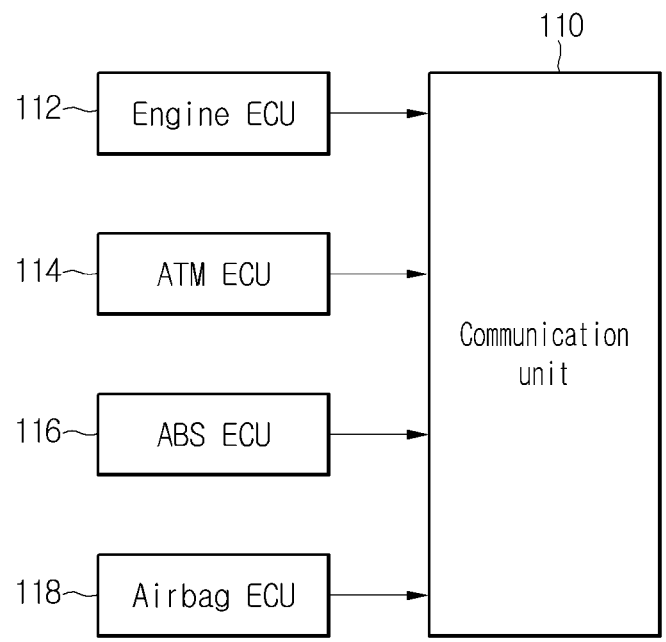
FIG. 4 is a block diagram to explain the operation of a communication unit shown in FIG. 2.

FIG. 4 is a block diagram showing the operation of the communication unit 110 shown in FIG. 2.

Referring to FIG. 4, the communication unit 110 is connected to an engine ECU 112, an ATM ECU 114, an ABS ECU 116, and an airbag ECU 118 to receive signals which are received through the engine ECU 112, the ATM ECU 114, the ABS ECU 116, and the airbag ECU 118.

The engine ECU 112 receives detection signals from various sensors to control the operation of the engine based on the received detection signals.

The engine ECU 112 transmits the detection signals from the various sensors to the motor control apparatus 100 through the communication unit 110, or transmits the information of the operating state of the engine to the motor control apparatus 100.

In addition, the ATM ECU 114 refers to an automatic transmission ECU to control the operation of an automatic transmitter based on the detection signal received from various sensors. The ATM ECU 114 transmits the received detection signal to the motor control apparatus 100, or transmits the operating state of the automatic transmission to the motor control apparatus 100.

In addition, the ABS ECU 116 refers to an anti-lock brake system ECU to control the operation of a brake based on the detection signal received from various sensors. The ABS ECU 116 transmits the received detection signals to the motor control apparatus 100 or transmits the operating state of the brake to the motor control apparatus 100.

In addition, the airbag ECU 118 controls the operation of an airbag based on the detection signals received from the various sensors. The airbag ECU 118 transmits the received detection signals to the motor control apparatus 100 or transmits the operating state of the airbag to the motor control apparatus 100.

In this case, a plurality of sensors or measuring units connected to the engine ECU 112, the ATM ECU 114, the ABS ECU 116, and the ECU 118 include a crank angle sensor, which detects the speed of an engine of a vehicle to check an idle state, a phase sensor, which detects the knocking state of the engine, a speed sensor, which detects the speed of the vehicle, an air flow meter, which measures air-intake of the engine, a temperature sensor, which measures the temperature of cooling water to diagnose the overheating of the engine, an air temperature sensor, which measures the temperature of intake air for the purpose of the optimal fuel injection, a throttle position sensor, which measures the opening angle of the throttle, a map sensor, which measures the pressure of the intake air, an oxygen sensor, which measures exhaust fumes, an injector for fuel injection, a main/fuel pump relay, which measures the driving of a fuel pump and the erroneous state of a relay, and an idle speed controller which controls the idle of the engine.

Figure 5:
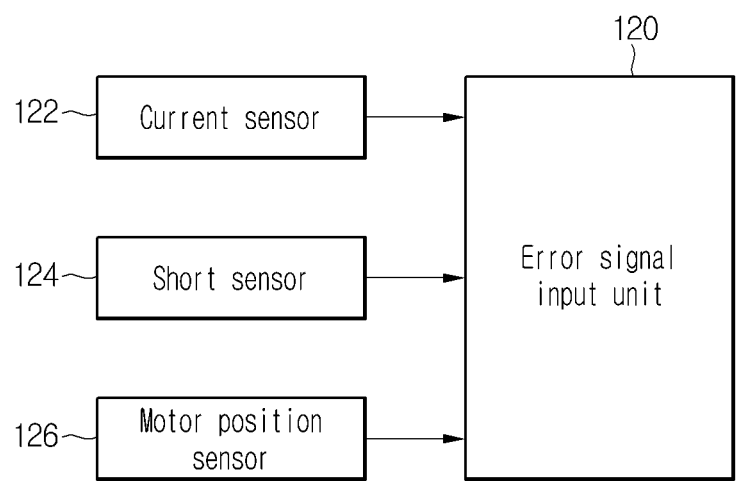
FIG. 5 is a block diagram to explain the operation of an error signal input unit shown in FIG. 2.

FIG. 5 is a block diagram to explain the operation of the error signal input unit 120 shown in FIG. 2.

Referring to FIG. 5, the error signal input unit 120 is connected to a current sensor 122, a short sensor 124, and a motor position sensor 126 to receive error signals detected through the current sensor 122, the short sensor 124, and the motor position sensor 126.

The current sensor 122 may include a current transformer (CT). The current sensor 122 detects current flowing through a specific point of the motor control apparatus 100 to apply the current to the error signal input unit 120.

In this case, the current sensor 122 may be provided only at the specific point of the motor control apparatus 100 to detect current flowing through the specific point. Alternately, the current sensor 122 may be provided at a plurality of points of the motor control apparatus 100 to detect the current through the points.

The short sensor 124 detects the short states of the switching devices constituting the PWM output unit 150 and provides an error signal according to the detected short state to the error signal input unit 120.

In other words, if the switching devices are shorted, abnormal power may be supplied to the motor due to the erroneous operation of the PWM output unit. Accordingly, the short sensor 124 detects the error signal resulting from the short state of the switching device, and provides the detected error signal to the error signal input unit 120.

The motor position sensor 126 detects the position of the motor and provides the information corresponding to the position of the motor to the error signal input unit 120.

The error signal input unit 120 receives the current value detected through the current sensor 122, the short state of the switching device detected through the short sensor 124, and the position value of the motor detected through the motor position sensor 126 and detects errors occurring in the motor control apparatus 100 based on the received current value, the received short state, and the received position value of the motor.

Figure 6:
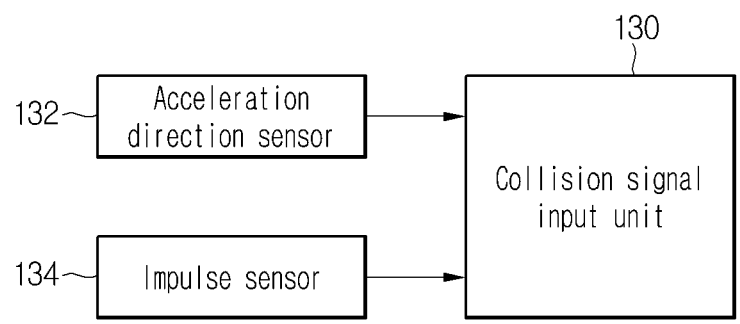
FIG. 6 is a block diagram showing the operation of a collision signal input unit shown in FIG. 2.

FIG. 6 is a block diagram to explain the operation of the collision signal input unit 130 shown in FIG. 2.

Referring to FIG. 6, the collision signal input unit 130 is connected to the acceleration direction sensor 132 and the impulse sensor 134 to receive the acceleration direction and the impulse on the vehicle detected through the acceleration direction sensor 132 and the impulse sensor 134, respectively.

The acceleration direction sensor 132 detects the acceleration direction of the vehicle, that is, the forward direction of the vehicle to provide the information corresponding to the acceleration direction to the collision signal input unit 130.

The impulse sensor 134 detects the impulse according to the impact when the impact is applied to the vehicle, and provides information corresponding to the impulse to the collision signal input unit 130.

As described above, primarily, the motor control apparatus 100 according to the embodiment stops the driving of the vehicle according to the impact state of the vehicle input through the collision signal input unit 130.

In addition, secondarily, if the impact is not applied to the vehicle, the motor control apparatus 100 stops the driving of the motor according to the detected error signal through the communication unit 110 and the error signal input unit 120.

As described above, the motor control apparatus 100 autonomously detects the errors of the vehicle without relying on the external devices and stops the driving of the motor due to the detected errors, thereby ensuring the safety of a driver.

In addition, if the driving of the motor is stopped due to the errors, the motor control apparatus 100 displays the information on the errors.

For example, if the driving of the motor is stopped due to errors occurring in the operation of an internal device, that is, errors of the current value detected through the current sensor, the motor control apparatus 100 displays information that the driving of the motor is stopped due to over-current or low current flowing therein.

In addition, if the driving of the motor is stopped as described above, the motor control apparatus 100 displays information on a scheme of restarting the driving of the motor, that is, a scheme of overcoming the erroneous operation of the internal device.

In addition, if the repair of a mechanic is required to restart the driving of the motor, the motor control apparatus 100 may display the information on a near garage, or may directly transmit information on the error to the near garage, so that the abnormal vehicle can be more easily repaired.

In addition, if the driving of the motor is stopped due to the impact, the motor control apparatus 100 informs a near hospital or a near garage of vehicle accident, so that the vehicle accident can be rapidly handled.

According to the embodiment, the motor control apparatus can autonomously determine the dangerous situation of a vehicle without relying on external devices, thereby actively stopping the vehicle upon the collision accident of the vehicle, so that the safety of occupants and the safety of a counterpart vehicle can be ensured.

In addition, according to the embodiment, even if the ECU or other safety devices are not normally operated due to the abnormal operation of the vehicle, the motor control apparatus autonomously stops the vehicle, so that the safety of the occupants or the safety of the counterpart vehicle can be ensured.

Figure 7:
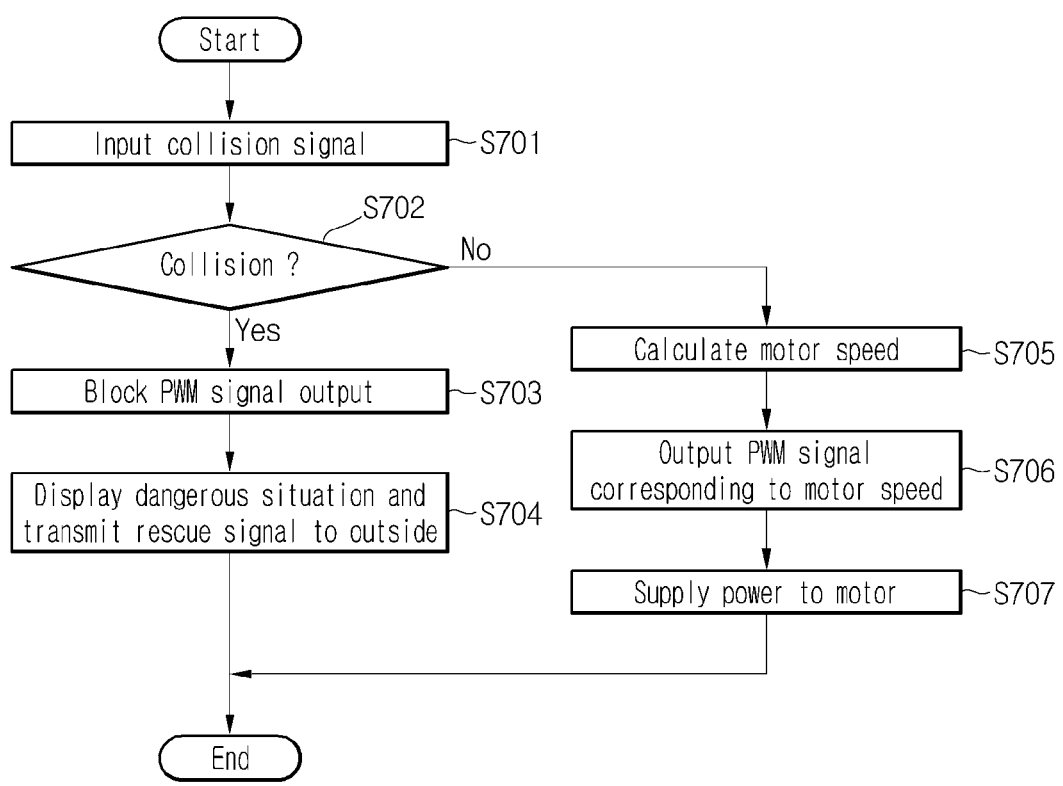
FIG. 7 is a flowchart showing a method of controlling driving of a motor by the motor control apparatus step by step according to the embodiment.

FIG. 7 is a flowchart showing a method of controlling driving of a motor by the motor control apparatus step by step according to the embodiment.

Referring to FIG. 7, the motor control apparatus 100 first receives a collision signal (step S701). The collision signal may include a signal on an acceleration direction of a vehicle and the information of the impulse exerted on the vehicle.

If the motor control apparatus 100 receives the collision signal, the motor control apparatus 100 determines if the vehicle is currently in collision danger according to the received the collision single (step S702).

In other words, the motor control apparatus 100 determines if the impulse exerted on the vehicle exceeds a preset reference value according to the information of the received impulse.

If the vehicle is in collision danger, the motor control apparatus 100 blocks the output of the PWM signal to cut off the power supplied to the motor (step S703).

In addition, a dangerous situation derived from the collision is displayed, and a rescue signal according to the collision is transmitted to the outside (step S704).

Meanwhile, if the vehicle is not in the collision danger, the motor control apparatus 100 calculates the speed of the motor by using a command of a driver and the feedback signal (step S705).

If the speed of the motor is calculated, a PWM signal is output in order to drive the motor at the calculated speed (step S706).

Thereafter, driving power is supplied to the motor according to the output PWM signal to operate the motor (step S707).

Figure 8:
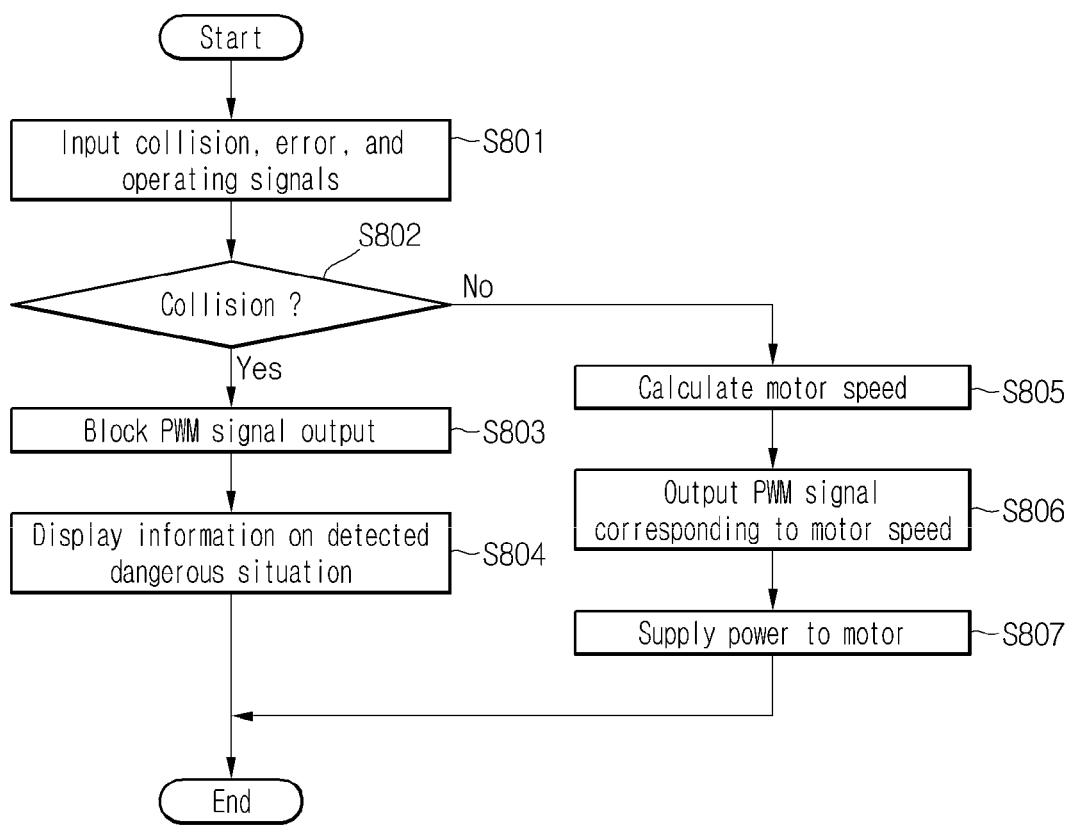
FIG. 8 is a flowchart showing a method of controlling driving of a motor by the motor control apparatus step by step according to another embodiment.

FIG. 8 is a flowchart showing a method of controlling driving of a motor by the motor control apparatus step by step according to another embodiment.

Referring to FIG. 8, the motor control apparatus 100 first receives a collision signal, an error signal, and an operation signal (step S801). The collision signal may include a signal based on the acceleration direction of a vehicle and information of the impulse exerted on the vehicle. The error signal is generated inside the motor control apparatus 100. In other words, the error signal may include the value of current flowing through a specific point of the motor control apparatus 100, a signal resulting from the short state of the switching device, and a position value of the motor. In addition, the operation signal includes operation signals provided from various ECUs.

If the collision signal, the error signal, and the operation signal are received, the motor control apparatus 100 determines if the vehicle is currently in danger according to the received collision signal, the error signal, and the operation signal (step S802). In other words, the motor control apparatus 100 determines if the vehicle is in collision danger, errors occur in an internal operation condition, or errors occur in an external operation condition.

If the vehicle is in collision danger, the motor control apparatus 100 blocks the output of the PWM signal to cut off power supplied to the motor (step S803).

In addition, the motor control apparatus 100 displays the information of the dangerous situation, provides countermeasures against the dangerous situation to the outside, and transmits the rescue signal for the countermeasures (step S804).

Meanwhile, if the vehicle is not in the dangerous situation, the motor control apparatus 100 calculates the speed of the motor by using the command of a driver and the feedback signal (step S805).

If the speed of the motor is calculated, a PWM signal is output in order to drive the motor at the calculated speed (step S806).

Thereafter, driving power is supplied to the motor according to the output PWM signal to operate the motor (step S807).

According to the embodiment, the motor control apparatus can autonomously determine the dangerous situation of a vehicle without relying on external devices, thereby actively stopping the vehicle upon the collision accident of the vehicle, so that the safety of occupants and the safety of a counterpart vehicle can be ensured.

In addition, according to the embodiment, even if an ECU or other safety devices are not normally operated due to the abnormal operation of the vehicle, the motor control apparatus can autonomously stop the vehicle, so that the safety of the occupants or the safety of the counterpart vehicle can be ensured.

As described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects

What is claimed is:

1. A method of controlling driving of a motor by a motor control apparatus, the method comprising:
   determining a collision state of a vehicle;
   stopping the driving of the motor according to the collision state of the vehicle; and
   receiving at least one of internal and external error signals of the motor control apparatus.

2. The method of claim 1, wherein the collision state of the vehicle is determined according to an impact degree exerted on the vehicle.

3. The method of claim 2, wherein the impact degree exerted on the vehicle is detected by the motor control apparatus.

4. The method of claim 1, wherein the determining of the collision state of the vehicle comprises:
   detecting an acceleration direction of the vehicle and impulse exerted on the vehicle; and
   determining the collision state of the vehicle by comparing the detected impulse with a preset reference value.

5. The method of claim 1, wherein the internal error signal comprises at least one of a current value at a predetermined point on a power supply line constituting the motor control apparatus, a short state of a switching device constituting the motor control apparatus, and a position value of the motor, and
   wherein the external error signal comprises a signal provided through at least one electronic control unit.

6. The method of claim 1, further comprising determining an error occurring in the vehicle by using at least one of the received internal and external error signals.

7. The method of claim 6, wherein the motor is driven when a collision of the vehicle and the error in the vehicle are not incurred.

8. The method of claim 6, further comprising calculating a speed of the motor when a collision of the vehicle and the error in the vehicle are not incurred and driving the motor corresponding to the calculated speed,
   wherein the speed of the motor is calculated based on a target instruction value of the motor and a feedback signal according to an operating state of the motor.

9. A motor control apparatus for controlling driving of a motor, the motor control apparatus comprising:
   a collision signal input unit to detect an impact degree in a vehicle and receive a collision signal corresponding to the detected impact degree;
   a motor control unit to determine a collision state of the vehicle according to the collision signal received through the collision signal input unit, and selectively generate a PWM signal to drive the motor according to the determined collision state; and a PWM output unit comprising at least one switching device to supply driving power to the motor through the PWM signal selectively generated from the motor control unit, wherein the motor control unit stops generation of the PWM signal to cut off the driving power supplied to the motor when a vehicle collision is determined.

10. The motor control apparatus of claim 9, wherein the collision signal input unit comprises:

an acceleration direction detecting sensor to detect an acceleration direction of the vehicle; and an impulse detecting sensor to detect an impulse exerted on the vehicle, and wherein the motor control unit determines the collision state of the vehicle by comparing the impulse detected through the impulse detecting sensor with a preset reference value.

11. The motor control apparatus of claim 9, further comprising:

an error signal input unit to receive an internal error signal of the motor control unit; and a communication unit to receive an external error signal transmitted through at least one electronic control unit, wherein the motor control unit generates the PWM signal by additionally applying the internal and external error signals.

12. The motor control apparatus of claim 11, wherein the error signal input unit comprises:

a current sensor to detect a current at a specific point on a power supply line constituting the motor control unit;

a short sensor to detect a short state of the at least one switching device; and a position sensor to detect a position of the motor.

13. The motor control apparatus of claim 11, wherein the motor control unit comprises:

a collision determining unit to determine the collision state of the vehicle according to the collision signal received through the collision signal input unit;

an error determining unit to determine an error state occurring in the vehicle according to the internal and external error signals received through the error signal input unit and the communication unit, respectively; and a PWM output control unit to selectively output the PWM signal according to the collision state and the error state, and wherein the PWM output control unit outputs the PWM signal when a vehicle collision and an error are not incurred.

14. The motor control apparatus of claim 13, wherein the motor control unit further comprises a motor speed calculating unit to calculate a speed of the motor by using a speed command of a driver received through the communication unit and a feedback signal according to a driving state of the motor, and wherein the PWM output control unit generates a PWM signal corresponding to the speed of the motor calculated through the motor speed calculating unit when the vehicle collision and the error are not incurred.

* * * * *